United States Patent [19]

Higgins

[11] Patent Number: 5,339,385

[45] Date of Patent: Aug. 16, 1994

[54] SPEAKER VERIFIER USING NEAREST-NEIGHBOR DISTANCE MEASURE

[75] Inventor: Alan L. Higgins, San Diego, Calif.

[73] Assignee: ITT Corporation, New York, N.Y.

[21] Appl. No.: 918,560

[22] Filed: Jul. 22, 1992

[51] Int. Cl.⁵ .............................................. G10L 9/00
[52] U.S. Cl. .................. 395/2.55; 395/2.82
[58] Field of Search ..................... 381/41–45; 395/2, 2.47, 2.48, 2.55, 2.59, 2.82

[56] References Cited

U.S. PATENT DOCUMENTS

| | | | |
|---|---|---|---|
| 4,694,493 | 9/1987 | Sakoe | 381/42 |
| 4,720,863 | 1/1988 | Li et al. | 381/42 |
| 4,773,093 | 9/1988 | Higgins et al. | 381/42 |
| 4,837,830 | 6/1989 | Wrench, Jr. | 381/42 |
| 5,121,428 | 6/1992 | Uchiyama et al. | 381/43 |
| 5,167,004 | 11/1992 | Netsch et al. | 395/2 |
| 5,216,720 | 6/1993 | Naik et al. | 381/43 |

OTHER PUBLICATIONS

Speaker Verification Using Randomized Phrase Prompting, Digital Signal Processing, Apr. 1991, by: A. Higgins, L. Bahler and J. Porter, pp. 89–106.

*Primary Examiner*—Allen R. MacDonald
*Assistant Examiner*—Michelle Doerrler
*Attorney, Agent, or Firm*—Arthur L. Plevy; Patrick M. Hogan

[57] ABSTRACT

A speaker verification system which accepts or rejects the claimed identity of an individual based on analysis and measurements of the speaker's utterances. The utterances are elicited by prompting the individual seeking identification to read test phrases chosen at random by the verification system composed of words from a small vocabulary. Nearest-neighbor distances between speech frames derived from such spoken test phrases and speech frames of corresponding vocabulary "words" from previously stored utterances of the speaker seeking identification are computed along with distances between such spoken test phrases and corresponding vocabulary words for a set of reference speakers. The claim for identification is accepted or rejected based on the relationship among such distances and a predetermined threshold value.

33 Claims, 2 Drawing Sheets

SPEAKER VERIFIER USING NEAREST-NEIGHBOR DISTANCE MEASURE

FIELD OF THE INVENTION

This invention relates to speaker verification systems in general, and more particularly to such a system where speaker identification judgements are made based on nearest-neighbor distances computed between presently uttered words and stored enrollment words.

BACKGROUND OF THE INVENTION

A speaker verification system determines whether or not a person claiming an identity previously established within the system is the identified person by comparing a password (which may be multiple speech "words") spoken by the person seeking to be identified at the time of the identification request with previously stored speech containing corresponding "words" entered into the system by the identified person. Such a system is particularly useful as a means for controlling entry/exit with respect to secured environments or to enable access to a secure communications system.

With most existing speaker verification systems, the comparison between the spoken password and the reference speech vocabulary previously entered into the system by the identified speaker is based on a measurement of the Euclidean distance between elements of the password speech and of the reference speech using computer processing of such speech elements which have been converted to digital form. Such comparison may also include a measurement of such distances from elements of the password speech and generic speech elements established as a reference base. If the distance so measured is less than a predetermined value, and, in the case of a verification system using reference speech measurement, less than any of such reference measurements, the speaker is judged to be the identified speaker, and if greater than the threshold value (or one or more of the reference measurements),the speaker is judged to be an impostor. An example of such a speaker verification system is found in U.S. Pat. No. 4,694,493 to Sakoe, entitled *Speaker Verification System*, issued on Sep. 15, 1987.

A limitation of all speaker verification systems is that an exact match between the password speech and the reference speech is seldom, if ever, achieved. This happens because of naturally occurring differences in a particular speaker's voice between the time of entering the reference speech into the system and of the request for verification, and due to the fact that the process of converting the analog waveform of the speaker's voice into digitized voice components may produce slight variations in such components as between the reference speech and the password speech, even in the absence of variations in waveform of the speaker's voice between the reference speech and the password speech.

This limitation is manifested in two possible errors for the speaker verification system: either a false rejection of the identified speaker or a false acceptance of an impostor. The consequence of such error is managed by a choice of a threshold value to be used as a basis for comparison with the measured distance between the password speech elements and the reference speech elements. A low threshold value can be expected to minimize the likelihood of an imposter being accepted, but will also increase the likelihood that the identified person will be rejected. A high threshold value, on the other hand, will diminish the likelihood of the identified person being rejected, but will increase the likelihood of an imposter being accepted. While the reliability (i.e., avoidance of erroneous result) of such a speaker verification system can be improved by increasing the number of voice components analyzed, this methodology suffers from the parallel constraints of (1) limitations in computer processing power and (2) the human-factor limitation that verification processing time must be very short (likely no more than 15-20 seconds) for acceptance by the user.

In the quest for a comparative measurement speaker verification system which achieves an acceptable level of security while at the same time minimizing the likelihood of the identified speaker being rejected, randomization techniques have also been used to determine components of the password from a vocabulary of reference "words" entered into the system by the identified speaker. Prior speaker verification systems typically prompted the person seeking to be identified to read a fixed phrase as a password, and compared that spoken password with previous utterances of the same phrase or password by the identified speaker. By using fixed prompts, such systems offered would-be impostors the opportunity to prepare responses (including tape recorded responses) in advance in order to increase their chances of being illegitimately verified. Through the use of test phrases composed at random at the time of verification, and requiring that the word content of the spoken utterance match the prompt, the likelihood of accepting an imposter is significantly reduced. There are so many possible prompts that would-be imposter has virtually no chance of being prepared with an acceptable response. An example of the use of such randomization techniques in speech verification systems is found in a paper entitled *Personal Identity Verification Using Voice* presented by Dr. George R. Doddington and printed in Proc. ELECTRO-76, May 11-14, 1976, pp. 22-4, 1-5.

Randomization of the test phrases does, however, introduce a new problem. Words occur in contexts (of surrounding words) that did not occur in the enrollment phrases. The context in which a word is spoken influences its pronunciation through coarticulation, caused by limitations in the movement of the speech articulators. These coarticulations, which have not been incorporated into the verification analysis model, contribute to the measured dissimilarity between the test and enrollment utterances, increasing the likelihood of a false rejection of the identified speaker.

Previous work by the inventor partially overcomes this difficulty by means of a scoring method called likelihood scoring. See A. Higgins, L. Bahlet and J. Porter, *Speaker Verification Using Randomized Phrase Prompting*, 1991. *Digital Signal Processing* 1, 89-106 (1991). The current invention builds upon this previous work, providing a more complete solution to the coarticulation problem. It is to be noted, however, that the invention applies as well to verification using fixed (i.e., non-random) phrase prompts.

Prior speaker verification systems have also commonly used word templates as the basis for matching speech utterances. In these methods, word templates are derived from occurrences of the words spoken during enrollment. As an example of the use of such templates, see U.S. Pat. No. 4,773,093 to Higgins, et al, entitled *Test-Independent Speaker Recognition System*

And Method Based On Acoustic Segment Matching, issued on Sep. 20, 1988, and assigned to ITT Corporation, the assignee herein. In verification, the word templates are temporally aligned with occurrences of the same words in the test phrases and used to derive a distance or dissimilarity score. Two methods of deriving word templates are generally used, which have different problems with respect to coarticulation. In one method, averaged templates are derived by temporally aligning all the enrollment occurrences of each word and averaging the constituent frames. The problem with averaged templates is that the diversity of coarticulations near word boundaries is poorly represented by the average. In the second method, multiple templates for individual word occurrences are extracted from the enrollment phrases (with multiple representations of each word). The problem with multiple templates is that coarticulation influences both the beginning and end of each word, and a prohibitively large number of templates per word would be needed to simultaneously match all possible contexts on both sides.

These problems with word template matching have been alleviated by a recent development in the speaker verification art—a comparison of test phrases with enrollment phases using individual frames, rather than words, as the atomic units. Frames of the enrollment data are used directly in the comparison, without averaging. Thus, the multiple templates problems are avoided because each frame is effectively a "snapshot" representing a single instant of time. The use of such frames of speech data is described at length in U.S. Pat. No. 4,720,863 to Li, et al, entitled *Method and Apparatus For Text-Independent Speaker Recognition*, issued on Jan. 19, 1988, and assigned to ITT Corporation, the assignee herein. See also U.S. Pat. No. 4,837,830 to Wrench, Jr. et al. entitled *Multiple Parameter Speaker Recognition System And Methods*, issued on Jun. 6, 1989, and also assigned to ITT Corporation.

A further improvement in the analysis and comparison of speech data has been developed by L. Bahler and is manifested in his invention called "Speaker Sorter" for which an application is copending under Serial No. 07/699,217, filed May 13, 1991 and is incorporated herein by reference. Bahler teaches the use of a baseline algorithm for speaker recognition which is non-parametric in nature and makes no assumption about the statistical distributions of speech features. The reference data used to characterize a given talker's speech patterns are a large set of speech feature vectors, not a set of estimated distribution parameters. A significant advantage of Bahler's methodology is its use of non-parametric methods because the further development of parametric methods—toward more complicated distributions which might approximate true speech more accurately—has the difficulty of estimating an increased number of statistical parameters which such models entail. It is an object of this invention to provide an improved speaker verification system having a low error rate while minimizing verification processing time and/or reducing computer processing power requirements.

SUMMARY OF THE INVENTION

In accordance with the present invention, a speaker verification system includes: an input speech processor for processing speech entered into the system whereby said speech is sampled, digitized and converted into frames, each frame being comprised of multiple speech vector components; an enrollment mechanism whereby one or more speakers may be enrolled into the system and wherein predetermined text spoken by a speaker is processed by the input speech processor and stored by the system; a mechanism responsive to a request for identification from a speaker claiming to be a specified enrolled speaker for generating a prompt phrase comprising one or more "words" derived from the predetermined spoken text entered by the specified enrolled speaker and whereupon the prompt phrase is spoken by the claiming speaker and the spoken prompt phrase is entered into the system and processed by the input speech processor; a mechanism for analyzing such spoken prompt phrase to detect the end points of the "words" comprising such spoken prompt phrase; a verification module for (1) determining nearest-neighbor distances $d_{i,T}$ and nearest-neighbor distances $d_{j,E}$, wherein nearest-neighbor distances $d_{i,T}$ are computed as the Euclidian distances between each frame of the processed spoken prompt phrase and speech frames from corresponding regions of each occurrence of the same "word" stored during enrollment into the system of the specified enrolled speaker and nearest-neighbor distances $d_{j,E}$ are computed as the Euclidian distances between each frame of each occurrence of each "word" comprising the prompt phrase and speech frames from corresponding regions of each occurrence of the same "word" in the processed spoken prompt phrase, (2) determining a distance $d_{T,E}$ between the processed spoken prompt phrase and corresponding "words" entered into the system during enrollment into the system of the specified enrolled speaker, wherein the distance $d_{T,E}$ is derived from an average of all the nearest-neighbor distances $d_{i,T}$ and an average of all the nearest-neighbor distances $d_{j,E}$ (3) determining a verification score from such distance data and (4) determining therefrom whether the claiming speaker is the specified enrolled speaker.

In accordance with a further aspect of the invention, the determination of the nearest-neighbor distances $d_{i,T}$ and of the nearest-neighbor distances $d_{j,E}$ by the verification module includes an additional step of weighting each of the distances by a bias value computed to discount the effects of diversity among repeated occurrences of the predetermined spoken text entered into the system by the specified enrolled speaker, and wherein the computation of Euclidean distances is restricted to a range defined by a score limit value.

In accordance with yet a further aspect of the invention, the determination of a verification score by the verification module additionally includes a means for determining a distance $d_{T,R}$ between the processed spoken prompt phrase and corresponding "words" entered into the system by a set of reference speakers and computed in like manner to that of the distance $d_{T,E}$, and the determination of whether the claiming speaker is the specified enrolled speaker is derived from a relationship between the distance $d_{T,R}$, the distance $d_{T,E}$, and the predetermined threshold value.

DETAILED DESCRIPTION OF THE INVENTION

Figure 1:
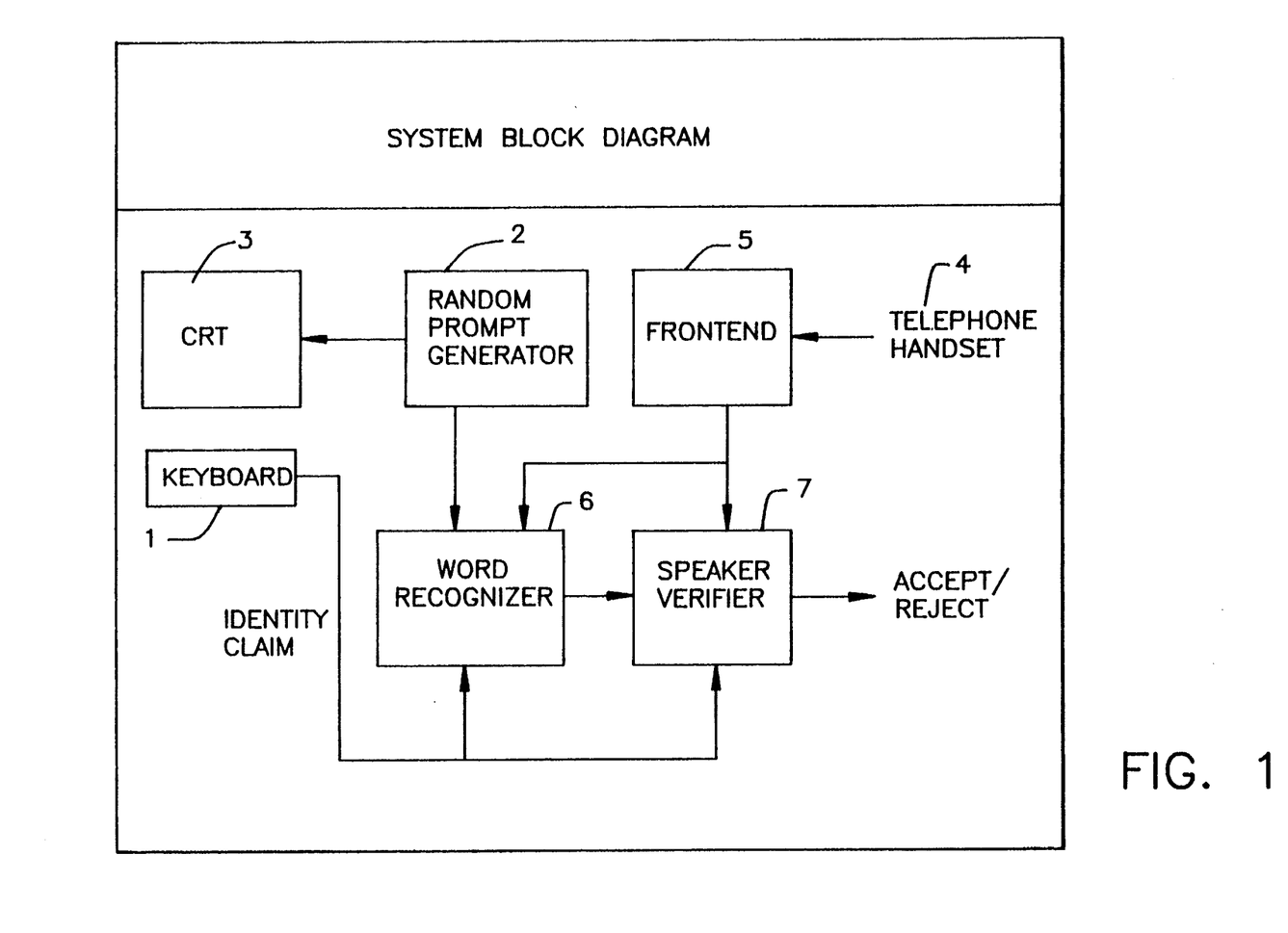
FIG. 1 is a block diagram showing a preferred embodiment of the present invention.

The structure enabling operation of the invention is shown in the block diagram of FIG. 1. When an identity claim is entered at the keyboard 1, the random prompt generator 2 displays a phrase prompt on the CRT screen 3 for the user to speak into a telephone handset 4. The electrical signal from the handset is amplified and converted to digital form. This conversion samples the signal at a rate of 8000 Hz using 12-bit samples. The sequence of samples is analyzed in 22.4 millisecond frames. The Frontend 5 in FIG. 1 performs this analysis. In this embodiment, the analysis produces a vector of 20 components each frame. The first 10 components of the vector are cepstral coefficients, such as described in B. Gold and C. M. Radar, *Digital Processing of Signals*, McGraw Hill, New York, 1969, and the last 10 are log area ratios, such as described in V. Viswanathan and J. Makhoul, *Quantization Properties of Transmission Parameters in Linear Predictive Systems*, IEEE Trans. on Acoustics, Speech and Sig. Proc vol ASSP-23, pp. 309-321, June 1975. Both the cepstral coefficients and log area ratios are derived from standard LPC-10 analysis For a description of such Linear Predictive Coding analysis, see T. Tremain, *The Government Standard Linear Predictive Coding Algorithm:* LPC-10, Speech Technology, pp. 40-49, April 1982 and J. D. Markel and A. H. Gray, Jr., *Linear Prediction of Speech*, Spring-Verlag, New York, 1976. The details of the Frontend 5 are not unique or critical to the invention. Other types analysis could be used as well.

The stream of frames from the Frontend 5 is sent to the Word-Recognizer 6 and Speaker-Verifier 7 components of the system. The Word Recognizer 6 marks the end points of each "word" in that stream of data, and in the preferred embodiment, determines whether the spoken verification phrase matches the prompted phrase. In performing that phrase recognition function, the Word Recognizer 6 uses a standard connected-word recognition algorithm, the details of which are not relevant to the invention, The user is rejected if the Word Recognizer 6 determines that the prompted phrase was not spoken. If the phrase is determined to have been spoken as prompted, the Word Recognizer 6 outputs a list containing the starting and ending frame numbers of each word in the spoken phrase. The Speaker Verifier 7 then begins its operation, as described below under Verification Function.

The enrollment process is the same as above, except that phrases determined to have been mis-spoken are reprompted, and an enrollment component replaces the speaker-verifier component. Verification Function.

An important improvement over the prior art is found in the verification functions of the system. To understand those speaker verification functions, first consider the following measure of the Euclidean distance between a test session T and an enrollment session E, as described by Bahler, supra. Let $t_j$ be the $j$th frame of T, and $e_i$ be the ith frame of E. The nearest-neighbor distance $d_{j,E}$ from $t_j$ to E is $$d_{j,E} = \min_i(|t_j - e_i|^2) \quad (1a)$$

and the nearest-neighbor distance $d_{i,T}$ from $e_j$ to T is $$d_{i,T} = \min_j(|t_j - e_i|^2) \quad (1b)$$

The frame-to-frame distances $(|t_j - e_i|^2)$ are computed for all pairs of frames $t_j$ and $e_j$, where j ranges over all the test frames and i ranges over all the enrollment frames. The measure of distance from T to E (i.e., distance $d_{T,E}$) is then $$d_{T,E} = \text{avg}_j(d_{j,E}) + \text{avg}_i(d_{i,T}) \quad (2)$$

Figure 2:
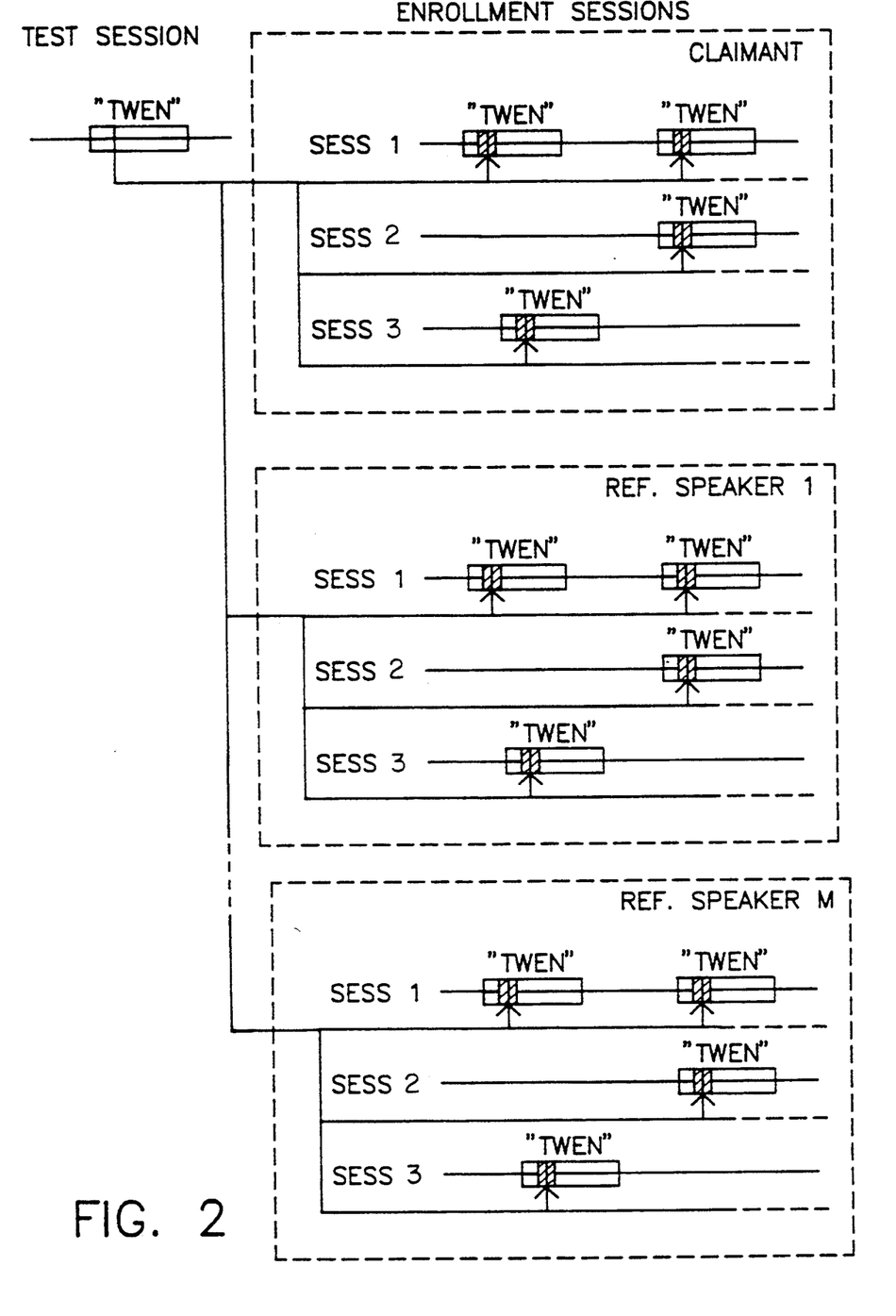
FIG. 2 illustrates the methodology for distance measurement which is used by this invention.

The speaker verifier taught here improves on this prior art distance measure in two ways. First, rather than comparing every frame of the test session with every frame of the enrollment session, the invention only compares test and enrollment frames from the same regions of the same words. For example, a test frame one fourth of the way through the word "Twen" (the vocabulary will be described below) is only compared with enrollment frames which are also approximately one fourth of the way through "Twen". This is illustrated in FIG. 2. The positions of frames within words in the test and enrollment sessions are determined from the word endpoints and supplied by the Word Recognizer 6. Every frame belonging to a word is assigned to a word index and a frame index. For frame i, the word index $W(j)$ identifies the word, and the frame $F(i)$ is a value in the range $0 \leq F(i) < 8$. The nth frame of an N-frame word is assigned the index $F(n) = md[n*(8-1)/(N-1)0]$, where $md[*]$ represents rounding to the nearest integer value. Test frames with index f are compared with all enrollment frames of the same word with indices 0 and 1 if $f=0$; or $f-1$, $f$, and $f+1$ if $1 \leq f < 7$; or 6 and 7 if $f=7$. The search range for matching enrollment frames is restricted in a similar manner. Equations 1a and 1b then become $$d_{j,E} = \min_{\substack{W(i) = W(j) \\ F(j)-1 \leq F(i) \leq F(j)+1}} (|t_j - e_i|^2) \quad (3a)$$

and $$d_{i,T} = \min_{\substack{W(j) = W(i) \\ F(i)-1 \leq F(j) \leq F(i)+1}} (|t_j - e_i|^2) \quad (3b)$$

Restricting the search range for nearest-neighbor distances in this way has the dual benefit of improving the system's verification accuracy and reducing the amount of computation, compared with searching over all frames. It can also be seen to minimize the verification processing time for a given level of security.

The second improvement over the prior art further affects the computation of nearest-neighbor distances. Each enrollment frame $e_i$ is assigned a bias value $b_i$ and a score-limit value $l_i$ during the enrollment procedure (according to the methodology described below). The bias value is chosen to discount the effects of diversity, such as from speech variations, among the enrollment phrases of a given speaker and the score-limit value is determined to reduce the effect of enrollment speech components lying outside the range within which most such values will be found. Applying these factors, nearest-neighbor distance $d_{j,E}$ and nearest-neighbor distance $d_{i,T}$ are again modified to become $$d_{j,E} = \min_{\substack{W(i) = W(j) \\ F(j)-1 \leq F(i) \leq F(j)+1}} (hlim\,[|t_j - e_i|^2 - b_i]_0^{l_i}) \quad (4a)$$

and $$d_{i,T} = \min_{\substack{W(j) = W(i) \\ F(i)-1 \leq F(j) \leq F(i)+1}} (hlim\,[|t_j - e_i|^2 - b_i]_0^{l_i}) \quad (4b)$$

where hlim[*] represents hard limiting.

$$hlim\,[x]_{x_1}^{x_2} = \begin{cases} x_1 & \text{if } x < x_1 \\ x & \text{if } x_1 < x < x_2 \\ x_2 & \text{if } x > x_2 \end{cases}$$

Referring again to FIG. 1, after the above-described computations of frame-to-frame nearest-neighbor distances are developed by Speaker Verifier 3, distance $d_{T,E}$ from test phrase T to enrollment session E is then determined in accordance with Equation 2. Verification, the final step in the Speaker Verifier's operation, may be performed based on the relationship of distance $d_{T,E}$ to a predetermined threshold, but in the preferred embodiment includes an additional step of computing the distance from the test session to the claimed user's enrollment sessions and from the test session to the enrollment sessions of a set of M other speakers called reference speakers.

In an embodiment, twenty reference speakers are used. The set of reference speakers for a given verification test depends on the claimed identity. Reference speakers are selected from the population of such speakers based on similarity of the reference speaker voices to the voice of the claimed user. A suitable algorithm for selecting reference speakers is described in A. Higgins, L. Bahler and J. Porter, *Speaker Verification Using Randomized Phrase Prompting*, 1991. Digital Signal Processing, Vol. 1, No. 2, April, 1991, published by Academic Press, Inc., p. 89.

The final verification score is then $$D_{T,C} = \min_{0 \leq i < S(C)} (d_{T,ci}) - \min_{0 \leq j < M} \left( \min_{0 \leq k < S(j)} (d_{T,r^j_k}) \right) \quad (5)$$

where C is the claimed speaker, S(C) is the number of enrollment sessions of C, $c_i$ is the claimed speaker's ith enrollment session, S(j) is the number of enrollment sessions of referenced speaker j and $r^j_k$ is referenced speaker j's kth enrollment session. The final verification score is compared with a fixed threshold value that can be adjusted for the desired tradeoff between false-acceptance and false-rejection error rates. The user is rejected if the verification score exceeds the threshold value, and otherwise accepted.

Determination of Bias and Score-Limit Values

As described above, a bias value and a score-limit value are determined during the enrollment process for each frame of each enrollment session. The bias value $b_i$ for frame j of an enrollment session is $$b_j = \min_{\substack{W(i) = W(j) \\ (F(j)-1 \leq F(i) \leq F(j)+1) \\ i \neq j}} (|e_j - e_i|^2) \quad (6)$$

and the score-limit value $l_j$ is $$l_j = \operatorname*{avg}_{\substack{W(i) = W(j) \\ (F(j)-1 \leq F(i) \leq F(j)+1) \\ i \neq j}} (|e_j - e_i|^2) \quad (7)$$

where variables $W_i$, $W_1$, $F_i$ & $F_j$ are as previously defined for Equations 3(a) and 3(b).

Enrollment Vocabulary

In the preferred embodiment of my invention, the enrollment speech material consists of "combination lock" phrases. An example is "35-72-41" pronounced "thirty-five, seventy-two, forty-one". Each phrase consists of numbers between 21 and 97. The enrollment vocabulary comprises 56 such numbers starting with the 90 two-digit numbers and eliminating: (1) 12 and the teens; (2) decades (20, 30, etc.); (3) double digits; and (4) numbers ending in 8. There are thus $56^3$ or 175,616 possible three "word" prompt phrases such a three-word prompt phrase being the preferred embodiment of the invention. The Word Recognizer 6 matches the phrases using partial-word templates ("Thir-ti-five-Sev-en-ti-two-Four-ti-one"). By doing this, the entire vocabulary can be represented using only 17 templates. In the preferred embodiment, a verification session will require the speaking of four prompted phrases. An enrollment session consists of 24 phrases which typically will require about three minutes to complete.

The "words" in the prompted verification phrases are drawn from the enrollment vocabulary and, in the preferred emodiment, are combined by choosing a word order at random according to a finite-state syntax which allows many possible word orders. Enrollment phrases are composed of the same "words" and are generated according to the same syntax, but in a non-random way. The set of enrollment phrases is selected to elicit a balanced representation of all the vocabulary "words". The enrollment and verification phrases are spoken in a connected manner, without pauses between the words.

I claim:

1. In a Speaker Verification System comprising a means for processing spoken test into frames of speech, a means for enrolling a speaker into the system, a means for eliciting a spoken test phrase from a speaker claiming to be a specified enrolled speaker, a means for determining one or more verification distances between said spoken test phrase and corresponding "words" entered into the system during said enrollment into the system of said specified enrolled speaker, and a means for determining a verification score from such verification distance data and for determining therefrom whether said claiming speaker is said specified enrolled speaker, the improvement wherein:

said processing means includes a means for converting said spoken text into non-parametric speech vectors, whereby at least one of said speech vectors is included in each of said frames of speech; and said determination of said verification distance includes a determination of nearest-neighbor Euclidean distances between single frames of speech associated with said spoken test phrase and corresponding frames of speech associated with said "words" entered into the system during said enrollment into the system of said specified enrolled speaker and between single frames of speech associated with said enrollment "words" of said specified enrolled speaker and corresponding frames of speech associated with said spoken test phrase.

2. The Speaker Verification System of claim 1 wherein said means for the determination of said verification distance additionally includes means for providing weighting of distances so determined by a bias value computed to discount the effects of diversity among repeated occurrences of said "words" entered into the system during said enrollment into the system by said specified enrolled speaker, and wherein said determination of nearest-neighbor Euclidean distances is restricted to a range defined by a score limit value.

3. The Speaker Verification System of claim 2 wherein said means for determining a verification score includes a comparison between said verification distance and a predetermined threshold value and wherein said determination of whether said claiming speaker is said specified enrolled speaker is derived from said comparison.

4. The Speaker Verification System of claim 2 wherein said means for determining a verification score additionally includes a means for determining a reference distance between said spoken test phrase and corresponding "words" entered into the system by a set of reference speakers and computed in like manner to that of said verification distance, and said determination of whether said claiming speaker is said specified enrolled speaker is derived from a relationship between said verification distance, said reference distance, and said predetermined threshold value.

5. The Speaker Verification System of claim 1 wherein said means for determining a verification score includes a comparison between said verification distance and a predetermined threshold value and wherein said determination of whether said claiming speaker is said specified enrolled speaker is derived from said comparison.

6. The Speaker Verification System of claim 2 wherein said means for determining a verification score additionally includes a means for determining a reference distance between said spoken test phrase and corresponding "words" entered into the system by a set of reference speakers and computed in like manner to that of said verification distance, and said determination of whether said claiming speaker is said specified enrolled speaker is derived from a relationship between said verification distance, said reference distance, and said predetermined threshold value.

7. The Speaker Verification System comprising:

means for processing spoken test entered into the system whereby said spoken test is sampled, digitized and converted into frames of speech, each frame being comprised of multiple speech vector components, said speech vector components being non-parametric in nature;

means for enrolling a speaker into the system whereby predetermined spoken text is entered into the system by said speaker and processed by said means for processing and thereafter stored by the system;

means responsive to a request for identification for a speaker claiming to be a specified enrolled speaker for generating a prompt phrase comprising one or more "words" derived from said predetermined spoken test entered by said specified enrolled speaker and whereupon said prompt phrase is spoken by said claiming speaker and said spoken prompt phrase is entered into the system and processed by said means for processing;

means for determining nearest-neighbor distances $d_{i,T}$, wherein said nearest-neighbor distances $d_{i,T}$ are computed as the Euclidian distances between each frame of said processed spoken prompt phrase and speech frames from corresponding regions of each occurrence of the same "word" stored during said enrollment into the system of said specified enrolled speaker;

means for determining nearest-neighbor distances $d_{j,E}$, wherein said nearest-neighbor distances $d_{j,E}$ are computed as the Euclidian distances between each frame of each occurrence of each "word" comprising said prompt phrase and speech frames from corresponding regions of each occurrence of the same "word" in said processed spoken prompt phrase;

means for determining a distance $d_{T,E}$ between said processed spoken prompt phrase and corresponding "words" entered into the system during said enrollment into the system of said specified enrolled speaker, wherein said distance $d_{T,E}$ is derived from an average of all said nearest-neighbor distances $d_{i,T}$ and an average of all said nearest-neighbor distances $d_{j,E}$; and means for determining a verification score related to said distances $d_{i,T}$, $d_{j,E}$ and $d_{T,E}$ and for determining therefrom whether said claiming speaker is said specified enrolled speaker.

8. The Speaker Verification System of claim 7 wherein said means determination of said nearest-neighbor distances $d_{,T}$ and of said nearest-neighbor distances $d_{j,E}$ includes an additional step of weighting each of said distances by a bias value computed to discount the effects of diversity among repeated occurrences of said predetermined spoken test entered into the system by said specified enrolled speaker, and wherein said computation of Euclidean distances is restricted to range defined by a score limit value.

9. The Speaker Verification System of claim 8 wherein said means for determining a verification score includes a comparison between said distance $d_{T,E}$ and a predetermined threshold value and wherein said determination of whether said claiming speaker is said specified enrolled speaker is derived from said comparison.

10. The Speaker Verification System of claim 9 wherein said means for determining a verification score additionally includes a means for determining a distance $d_{T,R}$ between said processed spoken prompt phrase and corresponding "words" entered into the system by a set of reference speakers and computed in like manner to that of said distance $d_{T,E}$, and said determination of whether said claiming speaker is said specified enrolled speaker is derived from a relationship between said distance $d_{T,R}$, said distance $d_{T,E}$, and said predetermined threshold value.

11. The Speaker Verification System of claim 7 wherein said means for determining a verification score includes a comparison between said distance $d_{T,E}$ and a predetermined threshold value and wherein said determination of whether said claiming speaker is said specified enrolled speaker is derived from said comparison.

12. The Speaker Verification System of claim 11 wherein said means for determining a verification score additionally includes a means for determining a distance $d_{T,R}$ between said processed spoken prompt phrase and corresponding "words" entered into the system by a set of reference speakers and computed in like manner to that of said distance $d_{T,E}$, and said determination of whether said claiming speaker is said specified enrolled speaker is derived from a relationship between said distance $d_{T,R}$, said distance $d_{T,E}$, and said predetermined threshold value.

13. The Speaker Verification System of claim 7 wherein said means for analyzing additionally determines whether the "words" comprising said spoken prompt phrase correspond to the words in said prompt phrase and rejects said claiming speaker in the event such correspondency does not exist.

14. The Speaker Verification System of claim 7 further including:
means for analyzing said processed spoken prompt phrase to detect the end points of "words" comprising said spoken prompt phrase, and wherein said corresponding regions of each occurrence of the same "word" as used by said means for determining nearest-neighbor distances $d_{i,t}$ or by said means for determining nearest-neighbor distances $d_{j,E}$ are determined in relation to said detected end points.

15. A speaker verification system comprising:
means for entering spoken test into the system;
means for sampling and digitizing said spoken test;
means for converting said digitized samples into frames of speech, each frame being comprised of multiple speech vector components, said speech vector components being non-parametric in nature;
means for enrolling one or more speakers into the system during an enrollment session whereby predetermined spoken test is entered into the system by each such speaker and processed by said means for sampling and means for converting and thereafter stored by the system;
means for identifying stored enrollment data for a particular enrolled speaker based on a claim for verification as said particular enrolled speaker;
mean for identifying one or more "words" derived from the spoken test entered by said particular enrolled speaker during said enrollment session and means for presentation of said "words" as a prompt to be spoken by a speaker during a verification session, said prompted spoken "words" being thereupon entered into the system via said means for entering and processed by said means for sampling and means for converting;
means for storing said prompted spoken "words";
means for comparing each speech frame from said verification session with speech frames from corresponding regions of each occurrence of the same "word" stored during said particular speaker's enrollment session, and computing nearest-neighbor distances $d_{i,T}$ between al such pairs of verification and enrollment frames;
means for comparing each speech frame from each occurrence of "words" comprising said prompt stored during said particular speaker's enrollment session with speech frames from corresponding regions of said prompted spoken "words", and computing nearest-neighbor distances $d_{j,E}$ between all such pairs of enrollment and verification frames;
means for computing a distance $d_{T,E}$ from an average of all said nearest-neighbor distances $d_{i,T}$ and an average of all said nearest-neighbor distances $d_{j,E}$;
means for comparing said distance $d_{T,E}$ with a predetermined value and causing an output signal to occur based on the difference between said distance $d_{T,E}$ and said predetermined value, said output signal being indicative of acceptance or rejection for a speaker claiming to be said particular enrolled speaker.

16. The Speaker Verification System of claim 15 wherein said means for computing said nearest-neighbor distances $d_{i,T}$ and of said nearest-neighbor distances $d_{j,E}$ includes an additional means for weighing each of said distances by a bias value, and wherein said computation of said distances is restricted to a range defined by a score limit value.

17. The Speaker Verification System of claim 15 wherein said means for comparing said distance $d_{T,E}$ with a predetermined value additionally includes a means for determining a distance $d_{T,R}$ between said prompted spoken "words" and corresponding "words" entered into the system by a set of reference speakers and computed in like manner to that of said distance $d_{T,E}$, and said output signal is caused to occur based on a relationship between said distance $d_{T,R}$, said distance $d_{T,E}$, and said predetermined threshold value.

18. The Speaker Verification System of claim 15 wherein the means for analyzing said prompted spoken "words" to detect the end points thereof additionally determines whether the "words" comprising said spoken prompt phrase correspond to the words in said prompt phrase and rejects said claiming speaker in the event such correspondency does not exist.

19. The Speaker Verification System of claim 15 further including:
means for analyzing said prompted spoken "words" to detect the end points thereof, and wherein said corresponding regions of each occurrence of the same "word" as used by said means for comparing verification speech frames, and thereby computing nearest-neighbor distances $d_{i,T}$ or by said means for comparing enrollment "words" speech frames, and thereby computing nearest-neighbor distances $d_{j,E}$ are determined in relation to said detected end points.

20. In a method of automatically verifying a speaker as matching a claimed identify, including the steps of processing spoken input speech signals into a series of frames of digital data representing said input speech, analyzing the speech frames by a speaker verification module which compares the incoming speech to a reference set of speech features and generates respective match scores therefrom, and determining whether the input speech corresponds with the identified speaker based upon the match scores, the improvement wherein:

said step of processing spoken input speech signals includes a substep of converting said spoken input speech into non-parametric speech vectors, whereby at least one of said speech vectors is included in each of said frames of data representing said input speech; and said comparison of incoming speech to reference speech features by said speaker recognition module includes generating a match score which is a sum of a first score set equal to the average of the minimum Euclidian squared distances between an input speech frame for a given region of a particular "word" and speech frames from said reference set of speech features corresponding to the same region of the same "word" over all frames of all "words" of said input speech, and a second score set equal to the average of the minimum Euclidian squared distances between a speech frame for a given region of a particular "word" from said reference set of speech features and an input speech frame corresponding to the same region of the same "word" over all frames of all "words" comprising said reference set of speech features.

21. A method of speaker verification according to claim 20, wherein said comparison of incoming speech to reference speech features by said speaker recognition module includes an additional step of weighting each of said Euclidean distances by a bias value computed to discount the effects of diversity among repeated occurrences of said predetermined spoken text entered into the system by said specified enrolled speaker, and wherein said Euclidean distances are computed over a range restricted by a score limit value.

22. A method of speaker verification according to claim 21, wherein said comparison of incoming speech to reference speech features by said speaker recognition module includes a further step in the generation of a match score of establishing a nearest-neighbor distance between input speech frames and enrollment speech frames for a set of reference speakers.

23. A method of speaker verification according to claim 21, further including a threshold verification wherein the substep of identifying the end points o the input speech "words" additionally recognizes whether the "words" of the verification phrase were spoken as prompted and rejects the verification request upon a failure of such threshold verification test.

24. A method of speaker verification according to claim 20, wherein said comparison of incoming speech to reference speech features by said speaker recognition module includes a further step in the generation of a match score of establishing a nearest-neighbor distance between input speech frames and enrollment speech frames or a set of reference speakers.

25. A method of speaker verification according to claim 20, further including a threshold verification wherein the substep of identifying the end points of the input speech "words" additionally recognizes whether the "words" of the verification phrase were spoken as prompted and rejects the verification request upon a failure of such threshold verification test.

26. The method of speaker verification according to claim 20, including the additional step of identifying the end points of "words" comprising said input speech, and wherein said corresponding regions of occurrences of the same "word" as used in determining said first score set of said second set are determined in relation to said identified end points.

27. In a method of automatically verifying a speaker as matching a claimed identity, including the steps of establishing the claimed identity, generation of a verification phrase comprising one or more "words" to be spoken by the speaker, processing the spoken input speech signals into a series of frames of digital data representing the input speech, analyzing the speech frames by a speaker verification module which compares the input speech to a reference set of speech features of the identified speaker obtained during prior enrollment sessions and generates respective match scores therefrom, and determining whether the input speech is identified with the identified speaker based upon the match scores, the improvement wherein:

said step of processing spoken input speech signals includes a substep of coverting said spoken input speech into non-parametric speech vectors, whereby a least one of said speech vectors is included in each of said frames of data representing the input speech; and said comparison of incoming speech to reference speech features by said speaker recognition module includes generating a match score which is a sum of a first score set equal to the average of the minimum Euclidian squared distances between an input speech frame for a given region of a particular "word" and enrollment speech frames corresponding to the same region of the same "word", over all frames of all "words" of the input speech, and a second score set equal to the average of the minimum Euclidian squared distance between an enrollment speech frame for a given region of a particular "word" with an input speech frame corresponding to the same region of the same "word", over all frames of all "words" comprising the reference set of speech features, wherein the distance from $t_j$ to the corresponding enrollment "word" E is:

$$d_{j,E} = \min_{\substack{W(i) = W(j) \\ F(j)-1 \leq F(i) \leq F(j)+1}} (|t_j - e_i|^2)$$

and the distance from $e_i$ to the corresponding test "word" T is:

$$d_{i,T} = \min_{\substack{W(j) = W(i) \\ F(i)-1 \leq F(j) \leq F(i)+1}} (|t_j - e_i|^2)$$

wherein $t_j$ is the j-th frame of the input "word" T and $e_i$ is the i-th frame of enrollment "word" E, $W_i$ and $F_i$ are respectively the word and frame indexes for frame i, and $W_j$ and $F_j$ are respectively the word and frame indexes for frame j, and wherein said first score is equal to the average of $d_{j,E}$ over all frames and said second score is equal to the average $d_{i,T}$ over all frames.

28. A method of speaker verification according to claim 27, wherein said comparison of incoming speech to reference speech features by said speaker recognition module includes an additional step of weighting each of said Euclidean distances by a bias value computed to discount the effects of diversity among repeated occurrences of said predetermined spoken text entered into the system by said specified enrolled speaker, and wherein said Euclidean distances are computed over a range restricted by a score limit value.

29. A method of speaker verification according to claim 28, wherein said comparison of incoming speech to reference speech features by said speaker recognition module includes a further step in the generation of a match score of establishing a nearest-neighbor distance between input speech frames and enrollment speech frames for a set of reference speakers.

30. A method of speaker verification according to claim 28, further including a threshold verification wherein the substep of identifying the end points of the input speech "words" additionally recognizes whether the "words" of the verification phrase were spoken as prompted and rejects the verification request upon a failure of such threshold verification test.

31. A method of speaker verification according to claim 27, wherein said comparison of incoming speech to reference speech features by said speaker recognition module includes a further step in the generation of a match score of establishing a nearest-neighbor distance between input speech frames and enrollment speech frames for a set of reference speakers.

32. A method of speaker verification according to claim 27, further including a threshold verification wherein the substep of identifying the end points of the input speech "words" additionally recognizes whether the "words" of the verification phrase were spoken as prompted and rejects the verification request upon a failure of such threshold verification test.

33. The method of automatically verifying a speaker according to claim 27 including the additional step of identifying the end points of the input speech "words", and wherein said corresponding regions of occurrences of the same "word" as used in determining said first score set of said second score set are determined in relation to said identified end points.

* * * * *

UNITED STATES PATENT AND TRADEMARK OFFICE
CERTIFICATE OF CORRECTION

PATENT NO. : 5,339,385
DATED : August 16, 1994
INVENTOR(S) : Alan l. Higgins

It is certified that error appears in the above-indentified patent and that said Letters Patent is hereby corrected as shown below:

Column 8, line 62, (claim 1) after "spoken" and before "into", delete "test" and insert --text--.
Column 10, line 1, (claim 7) after "spoken" delete "test" and insert --text--.
Column 10, line 2, (claim 7) after "spoken" delete "test" and insert --text--.
Column 10, line 16, (claim 7) after "spoken" delete "test" and insert --text--.
Column 10, line 55, (claim 8) after "spoken" delete "test" and insert --text--.
Column 11, line 44, (claim 15) after "spoken" delete "test" and insert --text--.
Column 11, line 45, (claim 15) after "spoken" delete "test" and insert --text--.
Column 11, line 52, (claim 15) after "spoken" delete "test" and insert --text--.
Column 11, line 60, (claim 15) after "spoken" delete "test" and insert --text--.

Signed and Sealed this

Eleventh Day of October, 1994

Attest:

*Attesting Officer*

BRUCE LEHMAN
*Commissioner of Patents and Trademarks*